(No Model.)
G. W. LEE.
RUNNING GEAR FOR VEHICLES.
No. 381,146. Patented Apr. 17, 1888.
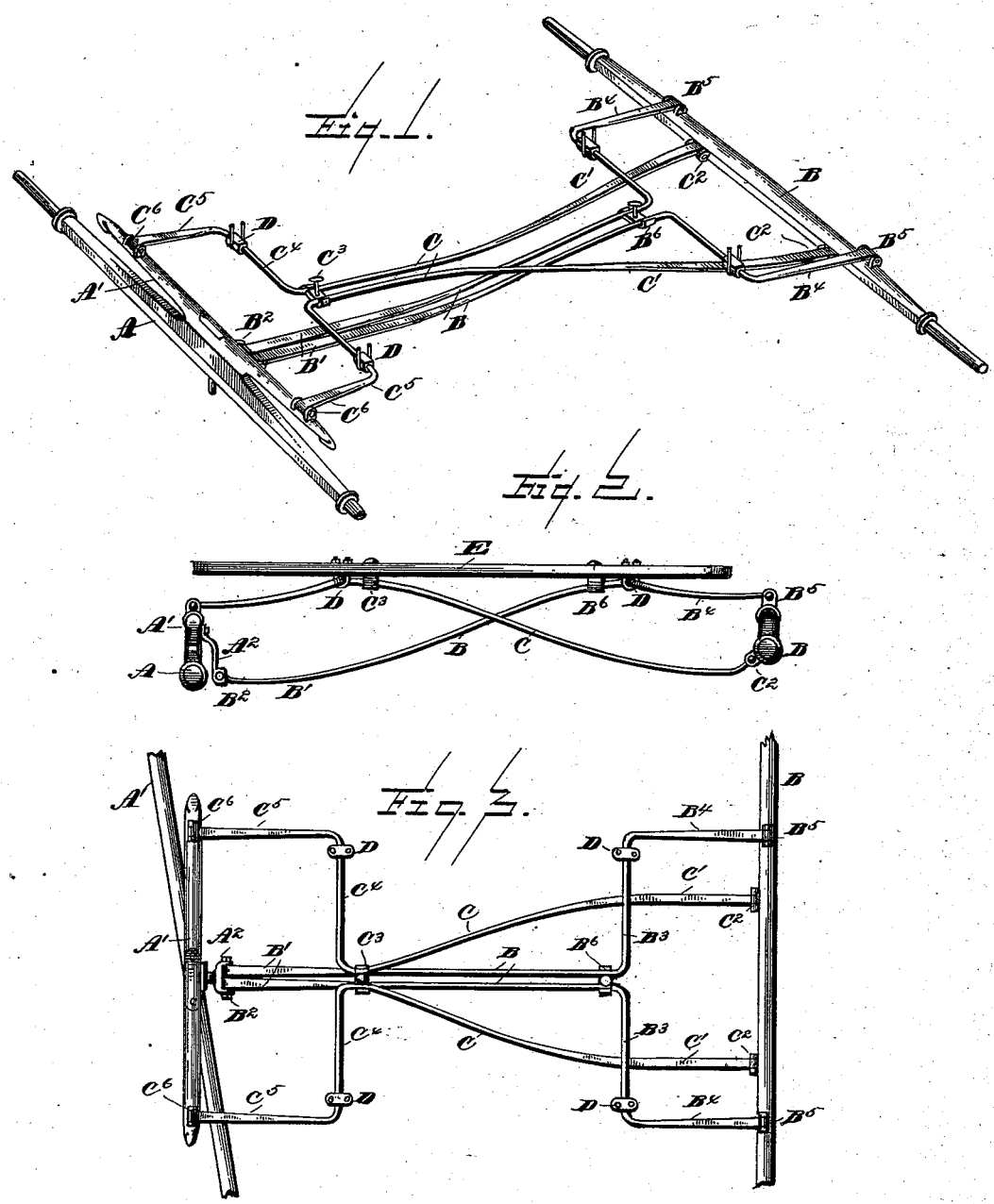
Witnesses:
L. C. Hills,
W. S. Duvall
Inventor:
GEORGE W. LEE.
E. B. Stocking
Attorney

UNITED STATES PATENT OFFICE.

GEORGE W. LEE, OF WOOSTER, OHIO, ASSIGNOR OF ONE-HALF TO WILLIAM H. BANKER, OF SAME PLACE.

RUNNING-GEAR FOR VEHICLES.

SPECIFICATION forming part of Letters Patent No. 381,146, dated April 17, 1888.

Application filed September 9, 1887. Serial No. 249,272. (No model.)

*To all whom it may concern:*

Be it known that I, GEORGE W. LEE, a citizen of the United States, residing at Wooster, in the county of Wayne, State of Ohio, have invented certain new and useful Improvements in Running-Gear, of which the following is a specification, reference being had therein to the accompanying drawings.

The object of this invention is to provide a combined platform-spring and running-gear for vehicles, and so arrange and combine the same as to produce a simple efficient spring that is light and durable, that will permit of low body-hanging, short turning, and which will obviate all side swinging and end pitching.

Other objects and advantages of the invention will hereinafter appear, and the novel features of the same will be particularly pointed out in the claims.

Referring to the drawings, Figure 1 is a perspective of a combined spring and running-gear constructed in conformity with my invention. Fig. 2 is a side elevation of the same, and Fig. 3 is a plan.

Similar letters of reference indicate like parts in all the figures of the drawings.

A and B represent the front and rear axles, respectively, and upon the former is mounted in the usual manner the head-bar A', projecting from the rear of which at its center is a clip-yoke, $A^2$.

In carrying out my invention I form the reach and spring integrally and of steel rods. B represents the front reach, the same consisting of two preferably round steel rods arranged parallel and in the same plane with each other, and having their front portions flattened to form springs B' and pivotally connected to the yoke $A^2$, as at $B^2$. These rods B extend rearwardly about three-fourths their length, where they diverge abruptly in opposite directions, as at $B^3$, a short distance, and then again rearwardly, and flattened near their ends to form rear springs, $B^4$, the ends thereof being connected to the rear axle by clips $B^5$.

The rear reach and front springs are somewhat similarly constructed, and consist of the two convergent reach-arms C, extending forwardly and flattened to form springs C', and connected to the rear axle by clips $C^2$, said reaches being connected by a clip, $C^3$, and diverging at their front in opposite directions to form arms $C^4$, and then projected forwardly and flattened to form front springs, $C^5$, and connected to the head-bar, as $C^6$. At the point where the front reach-rods, B, diverge to form the rear springs a clip, $B^6$, is provided, whereby the two rods are held in position. Body connecting and supporting clips D are provided at the four outer angles formed by the arms $B^3$ $C^4$, at which points the body E of the vehicle is supported. By this arrangement it will be seen that I have combined the reaches and springs, whereby the running-gear of a vehicle is greatly simplified, and that by reason of the arrangement described the springs, while exceedingly resilient in a vertical direction, allow no lateral or end pitching whatever.

As shown in Fig. 2, by pivoting the front reach to the depending clip-yoke $A^2$ and giving the reach a gradual upward curve the spring $B^4$ is brought to the proper position for supporting the vehicle. So, also, with the rear reach and front spring; the rear reach, being pivoted to the under side of the rear axle, is gradually curved upwardly, crossing the companion reach and spring at about the middle of the gear, bringing the spring $C^5$ in the same plane with the spring $B^4$. By this construction each reach not only acts as a brace, rigidly connecting both axles, but also as a sensitive and easy spring.

Having described my invention, what I claim is—

1. In combination with the front and rear axles of a vehicle, two combined reaches and springs, each comprising two rods connected at their ends to the axles and bolster, respectively, and bent to form supporting-arms connected to the body of the vehicle, and having their ends flattened to form springs, substantially as specified.

2. The combination, with the axles A and B, the former having the head-bar A', of the front reach, B, connected by the clip $A^2$ to said head-bar and extending rearwardly and connected by the clip $B^6$, thence extending rearwardly to form the arms $B^3$, flattened as at $B^4$, and connected to the rear axle, as at $B^5$, and of the reach C, flattened as at C', and connected, as at C², to the rear axle, and connected, as at C³, and diverging to form the arms C⁴, and flattened, as at C⁵, to form springs, and connected, as at C⁶, to the head-bar, substantially as specified.

3. The combination, with the body E and the axles A and B, of the reaches B and C, having the arms C⁴ B³, and the springs B⁴ C⁵, and connected as at B², B⁵, B⁶, C³, C⁶, and C², substantially as specified.

In testimony whereof I affix my signature in presence of two witnesses.

GEORGE W. LEE.

Witnesses:
C. C. ADAMS,
W. H. BANKER.